Patented May 4, 1948

2,440,731

UNITED STATES PATENT OFFICE 2,440,731

PREPARATION OF HEXACHLORETHANE

William H. Vining and Oliver W. Cass, Niagara Falls, N. Y., assignors to E. I. du Pont de Nemours & Company, Wilmington, Del., a corporation of Delaware No Drawing. Application June 25, 1943,
Serial No. 492,324

3 Claims. (Cl. 204—163)

This invention relates to the preparation of halogenated hydrocarbons of higher halogen content by the halogenation of halogenated hydrocarbons of lower halogen content. More particularly, it relates to the manufacture of hexachlorethane, $C_2Cl_6$, by reacting chlorine with perchlorethylene (also referred to as tetrachlorethylene), $C_2Cl_4$, under controlled conditions permitting substantially complete reaction of the perchlorethylene starting material and ready recovery of the product.

Hexachlorethane has previously been prepared from various hydrocarbon and chlorinated hydrocarbon starting materials. It has been prepared from chlorohydrocarbons of the methane and ethane series; from the former by high temperature chlorination and pyrolysis; and from the latter by complete chlorination under a wide variety of conditions. Moreover hexachlorethane, together with other chlorinated hydrocarbons, has been prepared by high temperature chlorination of a number of hydrocarbon and chlorohydrocarbon starting materials containing more than two carbon atoms.

One of the processes previously utilized on the industrial scale involved reacting perchlorethylene and chlorine. Unfortunately this process as carried out under the conditions ordinarily utilized industrially has been unsatisfactory for a number of reasons. Passage of gaseous chlorine into liquid perchlorethylene at a temperature below its boiling point (121° C.) results in the formation of hexachlorethane in the liquid perchlorethylene which, as its solubility in the liquid is exceeded, begins to crystallize out of the reaction mixture. If chlorination is continued in an attempt to convert all or substantially all of the perchlorethylene initially present to hexachlorethane there very quickly results a thick viscous mass which cannot be stirred and from which the hexachlorethane cannot be conveniently recovered by any practical method.

In an effort to avoid the formation of too thick a slurry and to permit recovery of the product from the apparatus gaseous chlorine has been fed into the liquid perchlorethylene only to that point, prior to complete chlorination of all perchlorethylene present, at which the slurry could still be actively handled. Then before the reaction mixture had become too viscous it was dropped into a crystallizing kettle and the crystalline hexachlorethane separated from the cooled liquid by filtration or centrifuging. In order to secure a salable product the hexachlorethane had to be dried to free it from residual adhering perchlorethylene. This was an exceedingly difficult problem in view of the high boiling point of liquid perchlorethylene and the low temperature at which hexachlorethane sublimes when subjected to heating.

This process, while satisfactory for the production of relatively small amounts of hexachlorethane, was open to a number of objections. Among these was the difficulty of recovering the product from the unreacted liquid perchlorethylene and the complexity of the apparatus required for economical operation. Not only did filtration or centrifuging of the hexachlorethane product from the liquid perchlorethylene in which it was suspended involve considerable difficulty, but because of the low subliming temperature of hexachlorethane it was practically impossible to dry the product at the elevated temperatures requisite for rapid drying without excessive losses by sublimation. The process as commercially operated provided, at best, only a slow and difficultly controllable batchwise process for preparing hexachlorethane.

We have now discovered that hexachlorethane can be prepared directly by the chlorination of perchlorethylene in a simple, easily controlled, flexible process which permits the complete chlorination of the total amount of supplied perchlorethylene in a single operation. The hexachlorethane product is readily recovered from the reaction mixture without difficulty and in quantitative yields. By reacting perchlorethylene with liquid chlorine in the presence of an excess amount of liquid chlorine it has been found that the perchlorethylene can be completely chlorinated in a single operation, the resulting hexachlorethane, which remains suspended in the excess chlorine, being readily secured in crystalline form simply by vaporizing off the excess amount of chlorine. Thus, instead of being faced with the necessity of drying the product by eliminating an adhering, high-boiling liquid, as in the presently available methods wherein the hexachlorethane must be freed from adhering perchlorethylene at relatively high temperatures, in the new method the hexachlorethane is freed from a low-boiling liquid (liquid chlorine), whereby dry product may be secured by the use of relatively low temperatures at which hexachlorethane has no tendency to sublime.

While the boiling point of liquid chlorine at atmospheric pressure is approximately —35° C., the boiling point of our reaction mixture comprising a solution of perchlorethylene in liquid chlorine is somewhat higher, and it is usually possible to carry out the reaction at temperatures within the range —15° C. to —30° C., without maintaining the reaction mixture under super-atmospheric pressure. It is generally preferred, however, to operate under pressures somewhat greater than atmospheric, under which circumstances reaction temperatures as high as 70° C. can be readily maintained, the chlorine remaining in the liquid state in the reaction vessel. While the reaction will proceed in the dark especially at the more elevated temperatures, although relatively slowly, we prefer to carry out the reaction in the presence of actinic radiation which may be supplied by ultra-violet light or, preferably, by the use of an ordinary electric light bulb. Without actinic radiation, reaction is very slow.

It is accordingly one of the objects of this invention to provide an improved process for the manufacture of hexachlorethane by reacting perchlorethylene and chlorine under conditions wherein the perchlorethylene can be converted in quantitative amounts to hexachlorethane in a single stage process, thus eliminating the necessity, characteristic of previous processes, of stopping the chlorination when only part of the perchlorethylene has been converted. Another object of this invention is to provide a process for the manufacture of hexachlorethane wherein the formed product will remain suspended in crystalline form in an excess amount of liquid chlorine, whereby the hexachlorethane may be readily recovered in crystalline form simply by volatilizing off the excess amount of liquid chlorine. Still another object of this invention is to provide operating conditions such that both reagents are present in the reaction chamber in maximum amounts, since liquid chlorine and perchlorethylene are miscible in all proportions at the temperatures at which the reaction is carried out, whereby the speed of the reaction is limited only by the rapidity with which the evolved heat can be removed.

Among other objects of our invention is that of providing a process wherein iron equipment can be utilized, since iron is not corroded appreciably by the reagents at the temperatures at which the reaction is carried out, whereas in the previous high temperature methods iron equipment could not be utilized and some more resistant material of construction, such as lead, or enamel-lined steel, had to be employed. As a further object there may be enumerated the provision of a process wherein the hexachlorethane is dried at low temperatures, temperatures below those at which serious losses by sublimation occur, from a low boiling adhering liquid, as contrasted with previous methods wherein it was necessary to dry the perchlorethylene at higher temperatures from a relatively high boiling liquid. These and still further objects of our invention will be apparent from the ensuing disclosure whereby hexachlorethane may be prepared by a direct and uncomplicated process requiring a minimum number of procedural steps.

Essentially the process involves adding perchlorethylene, either in one charge or intermittently in successive increments over a period of time, to a body of liquid chlorine maintained at temperatures below 60° C. while the contents of the reaction vessel are agitated and irradiated. The equipment utilized is ordinary steel or iron equipment. The heat evolved, as the reaction is exothermic in character, is removed by allowing chlorine to be vaporized, condensed, and returned to the reaction vessel. This is readily accomplished by utilizing apparatus provided with a reflux condenser. When the reaction is complete and all perchlorethylene present has been converted to hexachlorethane the excess chlorine is vaporized out of the reaction vessel leaving behind pure dry hexachlorethane in substantially quantitative yields.

The process may be operated either continuously or in batch operations. Both the perchlorethylene and liquid chlorine, in total amounts supplied, can be added to the reaction vessel at the beginning of the operations, or the perchlorethylene may be added in successive small increments throughout the reaction period. In the first case the heat is developed all at once and the cooling of the reaction mixture by refluxing the liquid chlorine may present some difficulties, although cooling by reflux may be augmented by additional cooling of the reaction vessel if necessary. When the perchlorethylene is added continuously over the reaction period as used up by reaction with the chlorine it is ordinarily somewhat easier to control the temperature. Irradiation is preferably provided by means of an ordinary electric light bulb, and at the beginning of operations the lights may be operated at reduced brilliancy and turned on to full brilliancy after thirty minutes or when there is evidence that the reaction has begun. Once the reaction is fairly under way the lights need not be operated at full brilliancy and can be operated at reduced brilliancy in order to prevent the reaction from becoming too violent. As the reaction proceeds and the temperature tends to drop it may be necessary to increase the amount of irradiation by operating the light source at full brilliancy, and completion of the reaction is generally indicated by rapid decline in temperature even with full light brilliancy. In order to insure complete reaction of perchlorethylene present it has been found advantageous to permit the reaction to continue for at least one hour after the appearance of this temperature drop. The reaction is ordinarily substantially complete at the end of about three to seven hours, although it may be advantageous to continue irradiation for a somewhat longer period, periods of over twelve hours being generally unnecessary.

Any pressure-resistant apparatus may be utilized, but very satisfactory results have been secured by the use of a jacketed steel reaction vessel having a conical bottom, which vessel is equipped with an agitator. There should also be provided means for charging the reactants into the vessel under pressure, and means for cooling or heating the jacket with water or steam. In typical apparatus with which we have secured satisfactory results the top of the reaction vessel is surmounted by a condenser of the tube and shell type for refluxing the chlorine and thus cooling the reaction mixture so as to prevent the temperature rise and pressure from becoming excessive. A well, conveniently constructed out of a borosilicate glass of low alkali content, containing no elements of the magnesia-lime-zinc group and no heavy metals, is provided in the apparatus in which ordinary tungsten filament lamps may be introduced for the purpose of irradiating the reaction mixture through the glass. As previously stated means for controlling the brilliancy of the light and thus the intensity of the radiation are advantageously provided. A thermometer well in which there may be positioned a thermometer for the purpose of observing temperatures throughout the reaction, together with suitable pressure measuring devices, are also part of the jacketed steel reaction vessel. It should be understood that while this type of apparatus has been found efficient, any other suitable form of apparatus may be utilized, it being only necessary that the perchlorethylene be reacted with liquid chlorine in an excess amount of liquid chlorine at a temperature below about 60° C. and above the temperature, —35° C., at which chlorine exists as a liquid at atmospheric pressure.

The ratio of liquid chlorine to perchlorethylene may vary within considerable limits although we have generally found it advisable to have the liquid chlorine present in at least 100% excess over that amount theoretically necessary to react with the amount of perchlorethylene present or introduced during the course of the reaction. This amount of excess chlorine suffices to maintain the reaction mass as a readily stirred slurry at the completion of the reaction.

At the conclusion of the reaction the excess chlorine may be readily removed from the crystalline hexachlorethane product suspended therein by vaporizing the excess chlorine through the condenser and condensing and collecting the chlorine in a suitable receiver. During this process, no difficulty is encountered in stirring the reaction mass, as the hexachlorethane separates as a free flowing crystalline powder. The pressure within the reaction vessel, when the reaction is carried out under pressure to permit the use of temperatures more elevated than about —15° C., drops during vaporization of the excess chlorine, and part of the chlorine in the reactor may be blown out to the atmosphere, or through a caustic scrubbing system of suitable type. If desired, a current of dry air or partial vacuum means may be applied for removing the last traces of chlorine. The resulting product has been found of satisfactory color and chemical composition and, in all respects, meets all commercial standards for hexachlorethane.

The following examples are illustrative of our process:

Example I

A pressure-resistant, iron reaction vessel, equipped with stirrer and reflux condenser of the tube and shell type, was charged with 100 lbs. of liquid chlorine and 30 lbs. of perchlorethylene. Upon irradiation of the charge with the light from a tungsten filament lamp positioned in a glass well the reaction began and was complete at the end of approximately 5¼ hours. The glass well was constructed of a borosilicate glass of low alkali content, containing no elements of the magnesia-lime-zinc group and no heavy metals. After recovering the dry hexachlorethane from unreacted chlorine there was obtained 43 lbs. of product, constituting a yield of substantially 100%. The product was crystalline in character, of satisfactory light color, and exhibited no tendency to cake on storage.

The maximum temperature attained by the reaction mixture during the reaction was 44° C., and the maximum pressure was 74 lbs. per square inch. The reaction mixture was cooled to a satisfactory extent by refluxing part of the liquid chlorine.

Example II

A round-bottomed flask was charged with 2840 parts of perchlorethylene. Reaction vessel was then cooled down below the boiling point of chlorine (—35° C.) at atmospheric pressure, whereupon chlorine in the amount of 3316 parts was added to the flask. The reaction mixture, comprising perchlorethylene in an excess of liquid chlorine, was then irradiated by the radiation of a 200 watt tungsten incandescent bulb, and cooled by the external application of solid carbon dioxide to remove the evolved heat. Stirring apparatus was operated in the bottom of the flask, and at the end of six hours the reaction was complete. The temperature during the reaction was —17° C. or below.

The dry hexachlorethane was recovered from unreacted chlorine and constituted a yield of approximately 94% of the theoretical. The product was crystalline in character, of satisfactory light color, and exhibited no tendency to cake during storage.

Example III

A one gallon iron pot provided with an efficient condenser for refluxing liquid chlorine was charged with 2840 parts of perchlorethylene. The pot was cooled to within the range —26 to —32° C., whereupon 3316 parts of liquid chlorine was added to the perchlorethylene. The charge was irradiated by the light from a 40 watt incandescent bulb. An iron stirrer positioned in the bottom of the pot was operated and, at the end of approximately five hours, the reaction was complete.

The hexachlorethane was recovered in the form of a very white crystalline solid simply by permitting the excess of liquid chlorine to evaporate off, followed by subjecting the hexachlorethane to air drying. The yield was approximately 97% and the product, although prepared in iron equipment was free from any appreciable amounts of metal. The product melted at 185.1° C. and was in all respects pure and commercially acceptable.

It is to be understood that the present invention is not to be limited to the particular details above-described, since obvious modifications of these details will occur to a person skilled in the art.

We claim:

1. The process of manufacturing hexachlorethane which comprises bringing together perchlorethylene and liquid chlorine in the presence of light as the catalyst at a temperature below 60° C., the quantity of perchlorethylene present being not to exceed one-half the stoichiometric proportion for the formation of hexachlorethane, and maintaining said reactants in the liquid phase and in contact with each other until substantially all of said perchlorethylene has reacted with chlorine to form hexachlorethane.

2. The process of manufacturing hexachlorethane which comprises bringing together perchlorethylene and liquid chlorine in the presence of light as the catalyst at a temperature between —35° C. and 60° C., the quantity of perchlorethylene present being not to exceed one-half the stoichiometric proportion for the formation of hexachlorethane, and maintaining said reactants in the liquid phase and in contact with each other until substantially all of said perchlorethylene has reacted with chlorine to form hexachlorethane.

3. The process of manufacturing hexachlorethane which comprises bringing together perchlorethylene and liquid chlorine in the presence of light as the catalyst at a temperature below 60° C., and at superatmospheric pressure, the quantity of perchlorethylene present being not to exceed one-half the stoichiometric proportion for the formation of hexachlorethane, and maintaining said reactants in the liquid phase and in contact with each other until substantially all of said perchlorethylene has reacted with chlorine to form hexachlorethane.

WILLIAM H. VINING.
OLIVER W. CASS.

REFERENCES CITED

The following references are of record in the file of this patent:

UNITED STATES PATENTS

| Number | Name | Date |
|---|---|---|
| 1,315,542 | Curme | Sept. 9, 1919 |
| 1,315,545 | Curme | Sept. 9, 1919 |
| 2,010,841 | Bender | Aug. 13, 1935 |
| 2,037,419 | Levine et al. | Aug. 14, 1936 |
| 2,147,577 | Hass et al. | Feb. 14, 1939 |
| 2,174,737 | Coleman et al. | Oct. 3, 1939 |
| 2,200,254 | Bender | May 14, 1940 |
| 2,200,255 | Bender | May 14, 1940 |
| 2,276,951 | Fisher | Mar. 17, 1942 |
| 2,296,614 | Hearne | Sept. 22, 1942 |

OTHER REFERENCES

Zeitschrift für Chemie, 1871, pages 535 and 536.
Industrial and Engineering Chemistry, March 1936, pages 333–339.